United States Patent [19]
Bauer et al.

[11] Patent Number: 5,859,900
[45] Date of Patent: Jan. 12, 1999

[54] UNIVERSAL CALL ACCESS WITH REVERSE BILLING

[75] Inventors: Thomas Michael Bauer, Belle Mead; Christopher P. Gilboy, Freehold, both of N.J.

[73] Assignee: AT&T Corp, Middletown, N.J.

[21] Appl. No.: 914,862

[22] Filed: Aug. 19, 1997

[51] Int. Cl.[6] .............................. H04M 15/00; H04M 1/64
[52] U.S. Cl. ......................... 379/144; 379/121; 379/114; 379/85.02; 379/70
[58] Field of Search ..................... 379/91.01, 111–121, 379/127, 201, 207, 85.02, 88.01, 70, 71, 144

[56] References Cited

U.S. PATENT DOCUMENTS

| | | | |
|---|---|---|---|
| 5,463,677 | 10/1995 | Bash et al. | 379/144 |
| 5,481,600 | 1/1996 | Alesio | 379/121 |
| 5,646,984 | 7/1997 | Oda | 379/121 |
| 5,675,607 | 10/1997 | Alesio et al. | 379/121 |

OTHER PUBLICATIONS

Patent No. 5,381,467, filed on Oct. 30, 1992 and issued on Jan. 10, 1995 to Rosinski et al. Class: 379/121.

*Primary Examiner*—Paul Loomis
*Attorney, Agent, or Firm*—Robert B. Levy

[57] ABSTRACT

A method for billing a telephone call to a called party for a telephone call between a calling party and the called party, comprising the steps of receiving a predetermined access number; prompting for a destination number, determining if the destination number will accept the cost of the telephone call; and completing the telephone call to the destination number. The method may find potential application in a situation where, for example, a child may need to call home from a public telephone, say at a movie theatre or a mall, without using a calling card, credit card, collect charging, an operator, or coins.

36 Claims, 3 Drawing Sheets

UNIVERSAL CALL ACCESS WITH REVERSE BILLING

BACKGROUND OF THE INVENTION

1. Technical Field

This invention generally relates to (1) a method of providing accessability between individuals wherein the caller relies on the called party to assume the costs of the call and (2) telephone billing systems and, more specifically, to a telephone billing system and method that allows for the cost of a telephone call to be automatically billed as a preauthorized charge to the called number.

2. Description of Related Art

Today, a customer who is "away from home" can use a pay phone to make telephone calls. Additionally, relatives, friends, and business associates may have a need for a relationship for which the called party accepts the cost of the call is important or appropriate. These calls are commonly billed to a calling card or credit card, placed as collect (i.e., the called party pays for the charges), or paid for by inserting coins directly into the telephone.

U.S. Pat. No. 5,381,467 to Rosinki et al. describes a billing system that allows the cost of a telephone call to be shared by two parties given (1) the originating ANI (automatic number identification), (2) the terminating ANI, (3) a predefined portion percentage, and (4) an optional PIN (Personal Identification Number).

Consequently, the prior art does not appear to address the problem of permitting, for example, a child to call home from a public telephone (for example, at a movie theatre or a mall) without using a calling card, credit card, collect charging, an operator, or coins.

SUMMARY OF THE INVENTION

The present invention provides for a telephone billing system that allows away-from-home customers the ability to keep in touch with a designated location, for example, their homes, without using a calling card, credit card, collect charging, an operator, or coins. Specifically, the present invention allows the away-from-home calling party the ability to call a designated location and have the cost of the telephone call automatically billed to that designated location.

A distinguishable feature of the present invention over Rosinki is that the present invention allows for the cost of the telephone call to be automatically billed as a preauthorized charge to the called number (similar to a collect or credit card call but not equivalent to either) using (1) a service specific access number (for example, 1-800-CALLHOME); (2) the destination number which must be the billed number, and (3) an optional CIV (Customer Identification & Verification). CIV includes a personal access number (entered using DTMF); speaker recognition; or any other means of recognition. An advantage of the present invention, for example, is that it permits a child who would not normally carry a credit card to call home from a public telephone (for example, at a movie theatre or a mall) without using a calling card, credit card, collect charging, an operator, or coins. The present invention also uses other mechanisms to filter out potentially unwanted reverse-charged calls.

A method for billing a telephone call to a called party for a telephone call between a calling party and the called party in accordance with the teachings of the present invention comprises the steps of receiving a predetermined access number; prompting for a destination number; determining if the destination number will or has authorized (either a priori or at receipt of call) to accept the cost of the telephone call; determining if the calling party is authorized to make the call; notifying the called party of the service call that they are receiving; allowing the called party to terminate the call without charge; and completing the telephone call to the destination number.

An apparatus for billing a telephone call to a called party for a telephone call between a calling party and the called party in accordance with the teachings of the present invention comprises means for receiving a predetermined access number from the calling party; means for prompting the calling party for a destination number; means for determining if the destination number is authorized to accept the cost of the telephone call; means for determining if the calling party is authorized to make the call; means for notifying the called party of the service call that they are receiving; means for allowing the called party to terminate the call without charge; and means for completing the telephone call to the destination number.

A telephone system for billing a telephone call to a called party for a telephone call between a calling party and the called party in accordance with the teachings of the present invention comprises an originating switch for receiving a predetermined access number from the calling party; a processor for prompting the calling party for a destination number and for determining if the destination number is authorized to accept the cost of the telephone call; and a terminating switch for completing the telephone call to the destination number.

These and other features of the present invention will become clear from reading the detailed description of the drawings which follows.

DETAILED DESCRIPTION

Figure 1:
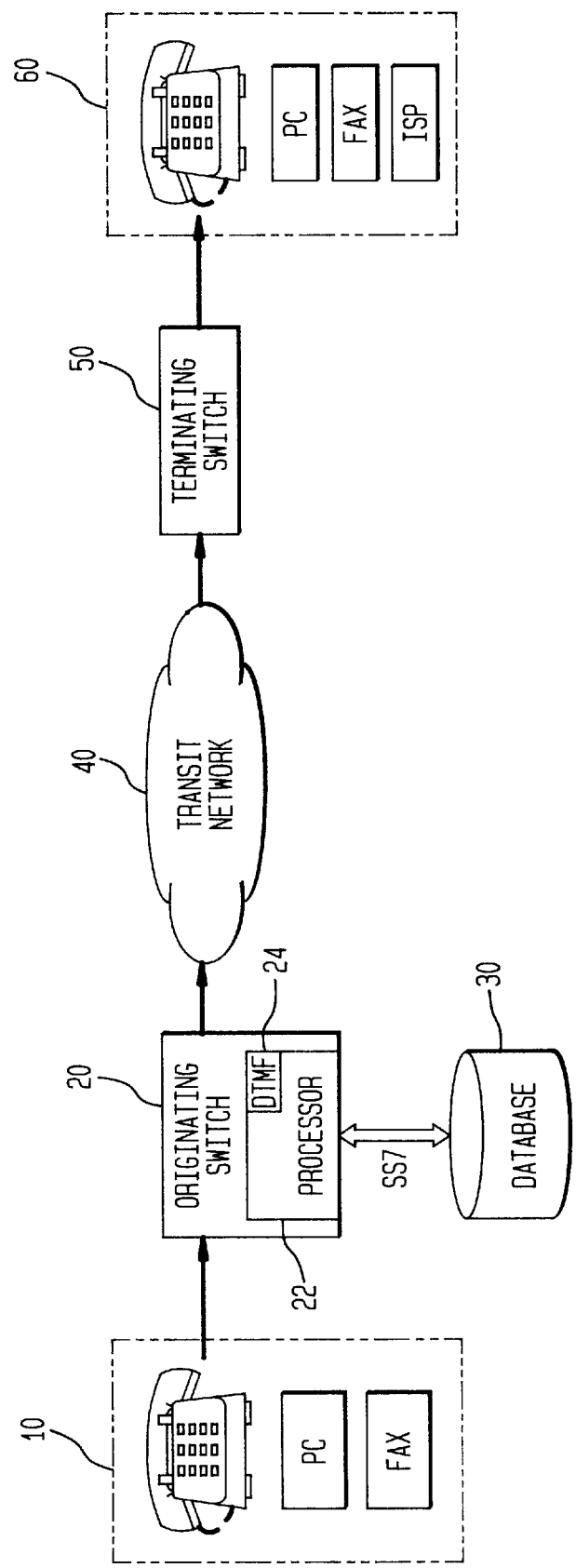
FIG. 1 illustrates a telephony network used to implement the telephone billing system of the present invention.

The present invention uses toll free access to allow a calling party to call a location and automatically reverse the charges of the call to that one location without the use of a calling card, collect call processing, an operator, or coins. The following examples illustrate some of the uses of the present invention.

EXAMPLE 1

A toll-free number is used to provide a simple way for callers to place calls to their home. This implementation allows a caller to directly call their home from any location without using a card or other form of billing (coins, collect, third number, etc.). Some of the benefits of this implementation are that it is universally accessible (via 800/888 dialing) and may only require the "home" destination number to place the call. This implementation may be utilized by families with children—by instructing the children that they can call home anytime by using the toll-free number and entering their home phone number and optional CIV (no calling card or coins needed). This implementation may also be utilized by on-the-go parents who want to be able to easily call home.

EXAMPLE 2

A toll-free number is used to provide a simple way for mobile employees to check in with their work location or office. Similarly to the first example, this implementation also allows a caller to directly call their work or office location from any location without using a calling card or credit card, or other form of billing (coins, collect, third number, etc.).

The following provides a high-level call flow process description of one preferred embodiment of the present invention:

(1) The caller dials a toll-free number;
(2) A prompt requests the caller to dial the 10-digit destination phone number;
(3) The caller enters the 10-digit destination number;
  (a) The destination number is checked to see if calls of this type are permitted to the destination number;
  (b) Optionally the destination number is checked to see if a CIV is required. If a CIV is required, a prompt for the CIV is requested, the caller enters their CIV, and CIV validation occurs;
(4) The call is completed to the Destination number;
(5) The called party answers and a branding announcement is played:
  (a) If no CIV was required, the branding announcement might say "An AT&T CALL-HOME Service will be connected in 5 seconds, stay on the line to accept." The called party may hang-up within, for example, 10 seconds without occurring a charge.
  (b) If a CIV was required, the announcement might say "AT&T CALL-HOME Service Call. You are connected."

In the embodiment as described above, the present invention is used as a spontaneous product—i.e., no presubscription, except for customers who want to register CIV control or block their destination numbers from access by the present invention. Because of the similarity of the spontaneous product's nature to collect calling, the present invention would enforce collect-billing restrictions for this variation of the invention; thus destination numbers restricted for collect billing would be denied service for this invention also.

In another preferred embodiment, the present invention may be used as a presubscribed product. That is, calls are only placed to destination numbers that are pre-enrolled. This pre-enrollment may be performed by a mass auto-enrollment of millions of customers, or by a selective auto-enrollment of customers who specifically request to be pre-enrolled. Once subscribers have enrolled the present invention provides an enhanced capability that can support the denial of collect calls to a destination and still support the use of the invention's billing method to place calls to the destination number via the CIV.

In yet another preferred embodiment, the present invention may be provided with CIV capabilities that are dependent on the location of the calling party. That is, a specific destination number may require a CIV if the calling party is calling from a predefined area (for example, specific area codes, cities, states, or international locations). Conversely, a specific destination number may not require a CIV if the calling party is calling from a predefined area (for example, specific area codes, cities, states, or international locations).

In yet another preferred embodiment, the present invention may have CIV capabilities that are dependent on the type or location of originating device. That is, a specific destination number may require a CIV if the calling party is calling from a predefined type of device (for example, pay phone, residential line, business line, facsimile machine, modem, etc.) or location (for example, airport, prison, hospital, etc.). Conversely, a specific destination number may not require a CIV if the calling party is calling from a predefined type of device (for example, pay phone, residential line, business line, facsimile machine, modem, etc.) or location (for example, airport, prison, hospital, etc.).

In yet another embodiment, the present invention may be embedded into a menu of an existing communication offering. For example, many carriers already provide toll-free access to "away-from-home" billing methods (for example, AT&T's 1-800-CALL-ATT®). One method of embedding this invention within one of these communication offerings would be to have the calling party dial the existing communication offer and press a dual tone multi-frequency (DTMF) digit or say a key word (for example, "call home") that can be received by a simple speech recognition device to activate the present invention.

Referring to FIG. 1, there is shown a telephony network used to implement the present invention. The originating party uses device 10 to initiate the telephone call. Device 10 may be a telephone set, computer, facsimile machine, or other device. Originating switch 20 communicates with database 30. Originating switch 20 may be a 5ESS® switch, a 4ESS® switch (available from Lucent Technologies, Inc., for example), a private branch exchange (PBX), or other local switching device. Database 30 may be an Advanced Intelligent Network (AIN) Service Control Point (SCP), a Network Control Point (NCP), a Line Information Data Base (LIDB), or other similar device. The call is then connected through transit network 40 and terminating switch 50 to the terminating party telephone device 60. Transit network 40 is a Public Switched Telephone Network (PSTN) in the United States or a similar network in another country or other private or public network. Device 60 may be a telephone set, computer, facsimile machine, or other device.

Figure 2A:
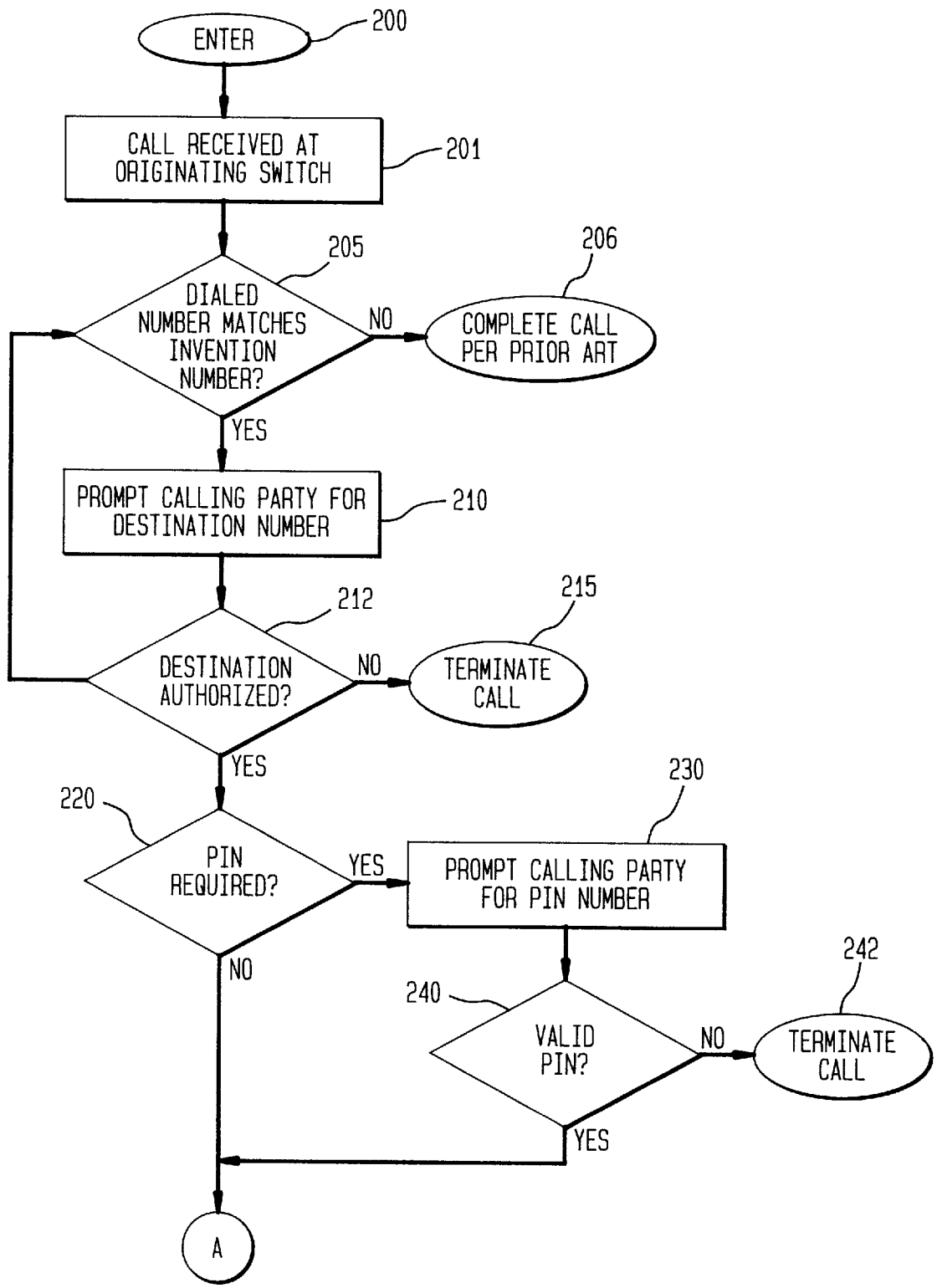
FIG. 2 illustrates a flow diagram of events that occur in the telephone billing system of the present invention.
Figure 2B:
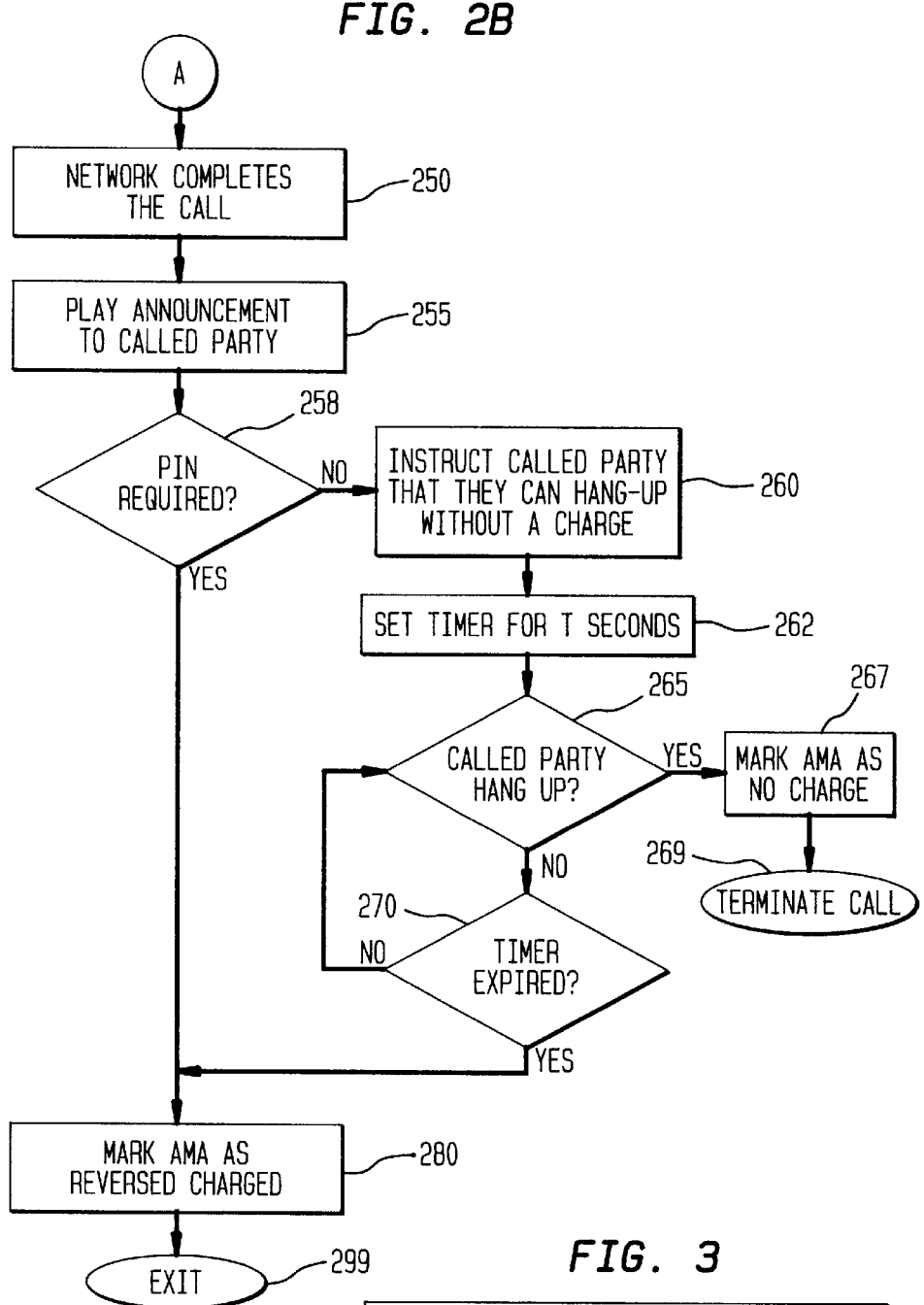

Referring to FIG. 2, there is shown a flow diagram of the sequence of events that occur in the present invention. Step 200 is the entry point. At step 201, the originating switch 20 receives an incoming call initiated by the calling party. At step 205, the originating switch 20 looks at the dialed number (dialed by the calling party) and compares it to the present invention's access number. That is, the originating switch 20 looks into a table, for example, a "destination number" table, stored in its memory, for example, at the originating switch or tandem switch to see if there is a match. If the dialed number does not match the invention's access number, step 206 completes the call per prior art (using a direct billing, calling card, credit card, collect charging, an operator, or coins). If the dialed number matches the invention's access number, the flow proceeds to step 210.

At step 210, the originating switch 20 uses processor 22 to prompt the calling party for the destination number. The destination number is a 10-digit number that (1) is the desired number that the calling party wishes to reach and (2) is the telephone number as to which will be charged the cost of the telephone call. Processor 22 will use DTMF collection and detection device 24 to collect the DTMF entry of the destination number from the calling party. (Of course, in dial pulse locations, a dial pulse collector would be employed.). Speech recognition or other forms of digit entry may also be used for this prompting and collecting.

Figure 3:
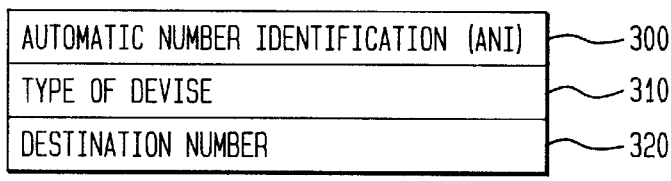
FIG. 3 illustrates a protocol message from the originating switch 20 to the database 30 of FIG. 1.

At step 212, processor 22 queries database 30 to see if the destination number is valid, that is, to see if the entered destination number will accept this type of reverse-charges billing. Referring to FIG. 3, there is shown a protocol message that is passed from processor 22 to database 30. The protocol message includes the ANI 300 (the 10-digit line number of the originating device 10 that is received by originating switch 20 and passed to processor 22); type or location of device 310 (for example, pay phone, facsimile machine, modem, etc.); and destination number 320 (entered by the calling party). The type of device 310 may be determined by either originating switch 20, database 30, or processor 22.

Database 30 uses ANI 300, type of device 310, and destination number 320 to determine if the call should be completed. Specifically, database 30 looks up destination number 320 in its tables and looks to see if calls are permitted to the destination number 320, given the destination number 320, ANI 300 (which is used to determine where the call is originating from by use of the NPA-NXX digits), and type of device 310 (which is used to determine the type of device or line, for example, if the calling party is using a pay phone, facsimile machine, etc.). Database 30 may also perform a query/integration of another database, such as a LIDB, to determine other destination number related information, such as collect denied.

Figure 4:
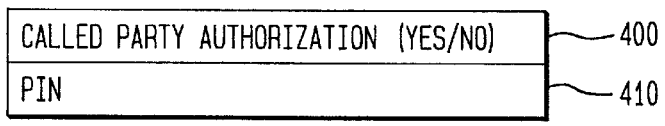
FIG. 4 illustrates a protocol message from the database 30 to the originating switch 20 of FIG. 1.

Database 30 then returns a message to processor 22. FIG. 4 illustrates a protocol message passed from database 30 to processor 22. The protocol message includes called party authorization (yes/no) 400 and CIV 410 (if required). The called party authorization information is a Boolean value, that is, a "yes" or "no" is most likely represented with a "0" or "1" set in a single bit. The called party authorization 400 is "yes" if database 30 declares that, so far, the destination number check passed. The called party authorization 400 is "no" if the destination number check failed. If the destination 320 requires a CIV number, then the CIV field 410 indicates that a CIV must be entered before the call could be completed. If the destination number 320 did not require a CIV number, then the CIV field 410 is left empty (i.e., null).

If the calls to destination number 320 is declared to be invalid (for reasons such as originating area (for example, prisons, international, etc.), calling party device, line type, etc.), step 215 will terminate the call with an error message to the calling party or ask the calling party to enter another number at step 205. The error message might say "Sorry, but the entered destination number will not accept this call" or "The entered destination number will not accept this call, please enter another destination number." Moreover, there is a time-out feature whereby an operator would come on after, for example, 30 seconds, if the calling party has not entered the destination number. If the destination number is declared to be valid, then proceed to step 220.

At step 220, processor 22 looks at the CIV 410 entry to see if a CIV is required. If a CIV is required, then step 230 has processor 22 prompting the calling party for the CIV number. Processor 22 uses DTMF collection device 24 to collect the DTMF entry of the CIV number from the calling party. Speech verification or other forms of digit entry could also be used for this prompting and collecting. Speech verification is especially useful for authorizing children callers. For example, processor 22 may prompt a child to say a keyword or the child's name and address in authorizing the call. Priority of CIV numbers could also be used to authorize calling parties. At step 240, processor 22 compares the CIV entered by the calling party with CIV 410 returned from database 30. If the two CIVs match, then the CIV entered by the calling party is determined valid and control proceeds to step 250. If the two CIVs do not match, then the CIV entered by the calling party is determined invalid and step 242 terminates the call or requests the calling party to enter another CIV number. Similarly, voice messages such as keywords or names and addresses may also be compared in determining the validity of the calling party. Originating switch 20 and processor 22 can also be designed in a manner that allows the CIV to be optionally entered prior to the initial query of database 30, thus allowing the destination number and CIV to be sent to the database and validated by database 30.

If no CIV is required, i.e., CIV 410 is null, then proceed to step 250.

At step 250, originating switch 20 routes the call through transit network 40 to terminating switch 50. When the called party answers, step 255 plays a brief announcement to the called party. This announcement is played by processor 22. The announcement might say "You are receiving a call to be charged to this location/an auto-collect call."

Step 258 is a conditional check that was already determined in step 220 (whether a CIV is required).

If a CIV is required, then the called party is not prompted for manual verification of the call.

If no CIV is required, then processor 20 plays a message that informs the called party that they can hang up within "T" seconds (where T is an appropriate amount of time such as 5 seconds) and the called party will not be charged for the call. The processor 20 can also play a message that informs the called party to press, for example, "1" to accept or "0" to deny the call. At step 262, processor 22 loads an internal timer with "T" seconds. At step 265, processor 22 checks to see if the called party has hung up or pressed the appropriate number (1 or 0).

If the called party has hung up or has pressed "0", then step 267 marks the AMA (automatic message accounting) record as "no charge" and step 269 terminates the call (or prompts the calling party for another dialed number in step 205).

If the called party has not hung up, then step 270 checks to see if the timer has expired. If the timer has not expired, then return to step 265. If the timer has expired or the called party has pressed "1", then the called party has decided to remain on the line and accept the reverse charges.

At step 280, originating switch 20 records the appropriate billing information in the AMA record so that the call is reverse-billed.

Step 299 is the exit point of the flow diagram.

While the invention has been described in detail with reference to a preferred embodiment and selected variations thereof, it should be apparent to those skilled in the art that many modifications and variations are possible without departure from the scope and spirit of this invention as defined in the appended claims.

We claim:

1. A method for billing a telephone call to a destination number of a called party for a telephone call between a calling party and the called party, comprising the steps of:
   receiving a call dialed by the calling party to a predetermined access number;
   prompting the calling party for a destination number;
   determining if the destination number dialed by the calling party is authorized to automatically accept the cost of the telephone call dialed by the calling party, and if so;
   completing the telephone call to the destination number; and automatically billing the cost of the call to the destination number.

2. The method of claim 1, wherein the predetermined access number is a toll free number.

3. The method of claim 1, wherein the determining step further comprising the step of checking the validity of the destination number, the ANI of the calling party, and the device used by the calling party.

4. The method of claim 1, wherein the determining step further comprising the step of checking the destination number to see if a CIV is required.

5. The method of claim 4, wherein the CIV requirement is dependent on the location of the calling party.

6. The method of claim 5, wherein the location includes a specific area code, city, state, or international location.

7. The method of claim 4, wherein the CIV requirement is dependent on the type of originating device.

8. The method of claim 7, wherein the originating device includes a pay phone, residential line, business line, facsimile machine, or modem.

9. The method of claim 4, further comprising the step of prompting for the CIV if the CIV is required.

10. The method of claim 9, further comprising the step of validating the CIV.

11. The method of claim 10, wherein the telephone call is terminated if the CIV is not valid.

12. The method of claim 1, wherein the determining step further comprising the step of checking the destination number to see if a voice verification of the calling party is required.

13. The method of claim 12, further comprising the step of prompting for a voice message if the voice verification of the calling party is required.

14. The method of claim 13, further comprising the step of validating the voice message.

15. The method of claim 14, wherein the telephone call is terminated if the voice message is not valid.

16. The method of claim 1, further comprising the step of routing the telephone call to the destination number.

17. The method of claim 16, further comprising the step of answering the telephone call.

18. The method of claim 17, further comprising the step of accepting the telephone call by staying on the line.

19. The method of claim 18, further comprising the step of rejecting the telephone call by hanging up.

20. An apparatus for billing a telephone call to a destination number of a called party for a telephone call between a calling party and the called party, comprising:

means for receiving a call dialed by the calling party to a predetermined access number;

means for prompting the calling party for a destination number;

means for determining if the destination number is authorized to automatically accept the cost of the telephone call dialed by the calling party to the destination number;

means for completing the telephone call to the destination number when the destination number is authorized to automatically accept the cost of the telephone call dialed by the calling party and;

means for automatically billing the call charges to the destination number.

21. The apparatus of claim 20, wherein the predetermined access number is a toll free number.

22. The apparatus of claim 20, wherein the determining means further comprising means for checking the validity of the destination number, the ANI of the calling party, and the device used by the calling party.

23. The apparatus of claim 20, wherein the determining means further comprising means for checking the destination number to see if a CIV is required.

24. The apparatus of claim 23, wherein the CIV requirement is dependent on the location of the calling party.

25. The apparatus of claim 24, wherein the location includes a specific area code, city, state, or international location.

26. The apparatus of claim 25, wherein the CIV requirement is dependent on the type of originating device.

27. The apparatus of claim 26, wherein the originating device includes a pay phone, residential line, business line, facsimile machine, or modem.

28. The apparatus of claim 23, further comprising means for prompting for the CIV if the CIV is required.

29. The apparatus of claim 28, further comprising means for validating the CIV.

30. The apparatus of claim 29, wherein the telephone call is terminated if the CIV is not valid.

31. The apparatus of claim 20, wherein the determining means further comprising means for checking the destination number to see if a voice verification of the calling party is required.

32. The apparatus of claim 31, further comprising means for prompting for a voice message if the voice verification of the calling party is required.

33. The apparatus of claim 32, further comprising means for validating the voice message.

34. The apparatus of claim 33, wherein the telephone call is terminated if the voice message is not valid.

35. The apparatus of claim 20, further comprising means for routing the telephone call to the destination number.

36. A telephone system for billing a telephone call to a destination number of a called party for a telephone call between a calling party and a called party, comprising:

an originating switch for receiving a call dialed by the calling party to a predetermined access number from the calling party;

a processor for prompting the calling party for a destination number and for determining if the destination number is automatically authorized to accept the cost of the telephone call dialed by the calling party; and a terminating switch for completing the telephone call to the destination number; and automatically billing the cost of the call to the destination number.

* * * * *